March 20, 1945. J. D. FORBES 2,371,814
PARACHUTE RELEASE
Filed Aug. 10, 1943  2 Sheets-Sheet 1
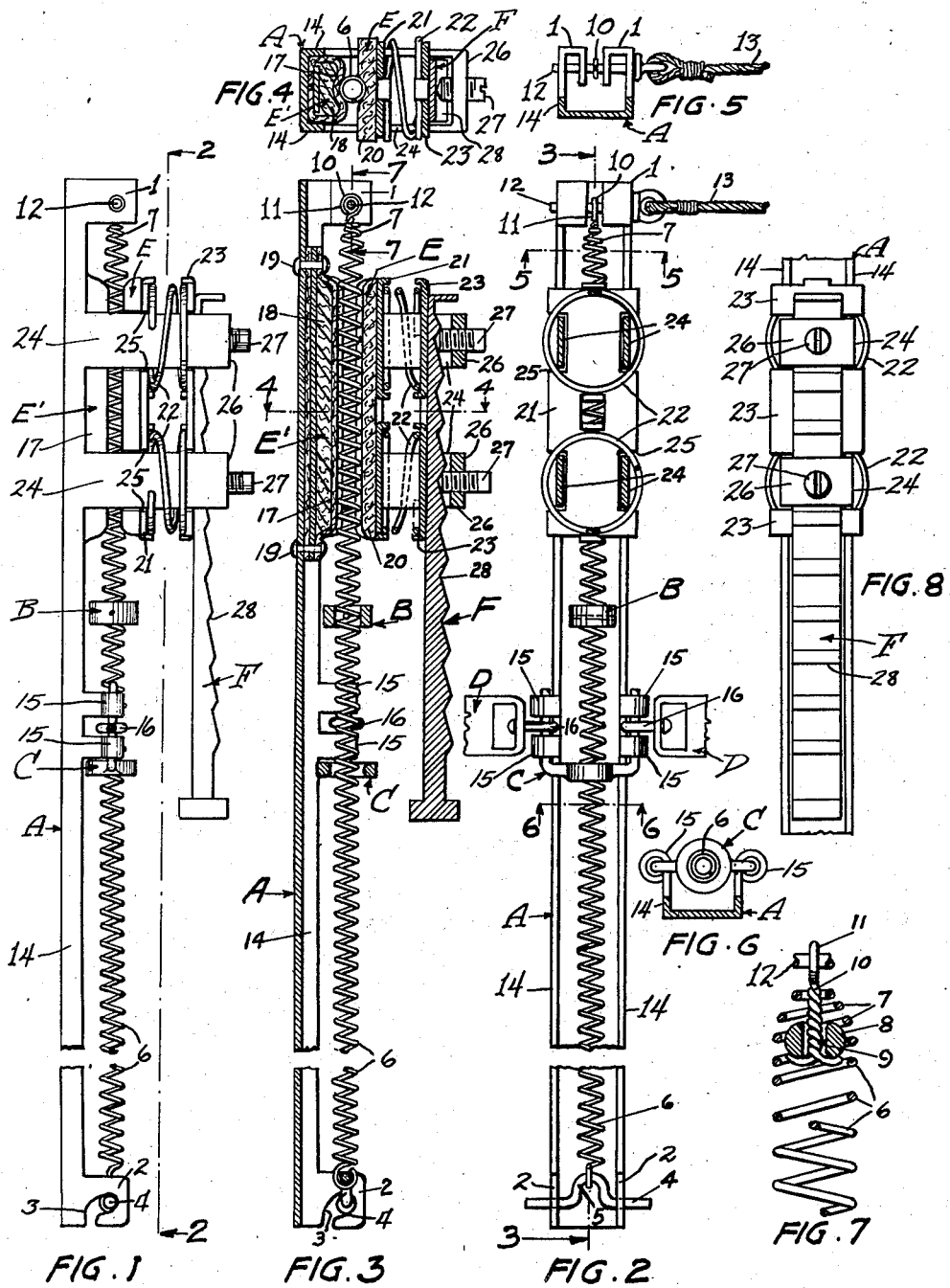
INVENTOR.
JOHN D FORBES
BY Munn, Liddy + Glaccum
ATTORNEYS

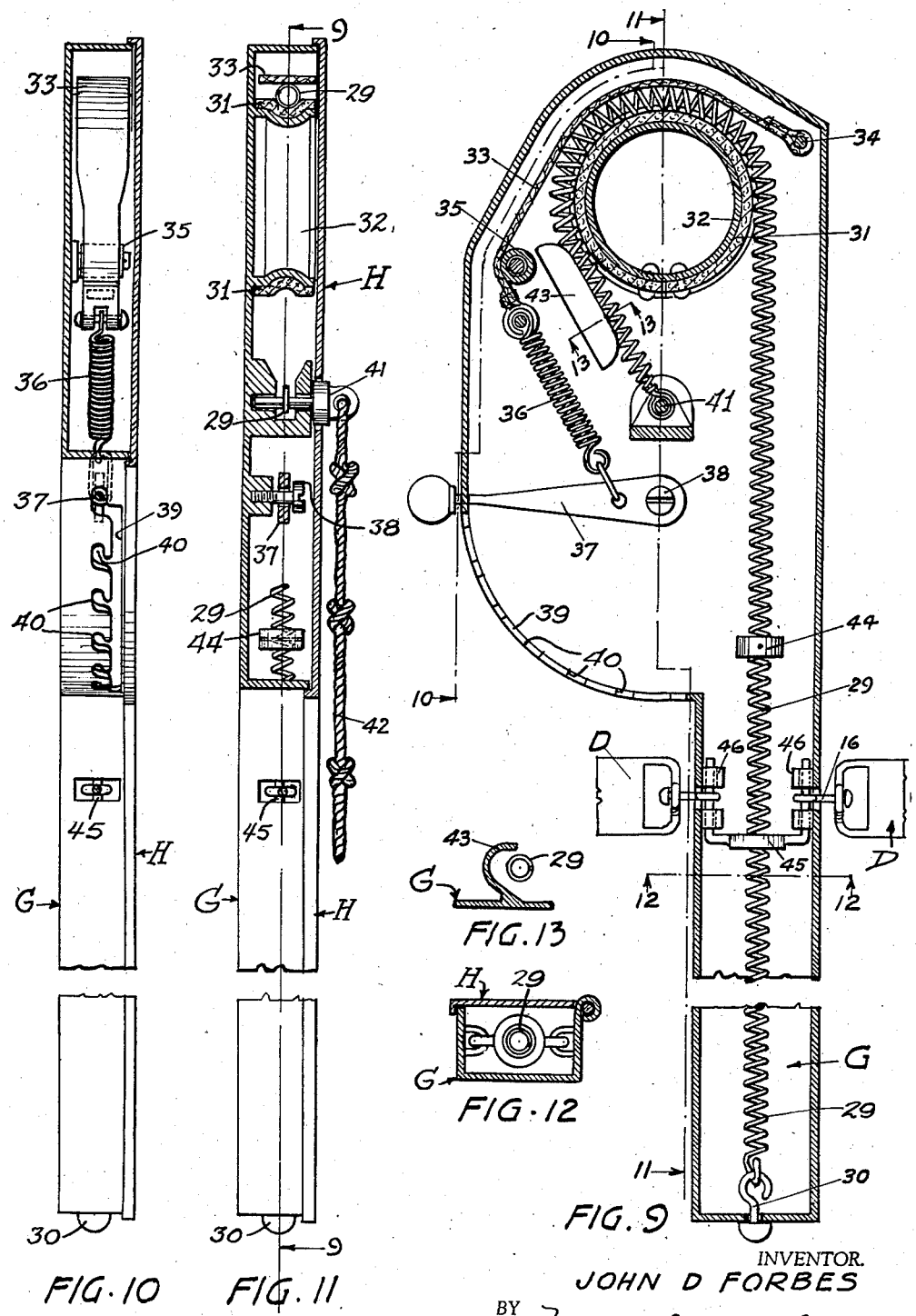

Patented Mar. 20, 1945

2,371,814

UNITED STATES PATENT OFFICE 2,371,814

PARACHUTE RELEASE

John D. Forbes, San Francisco, Calif.

Application August 10, 1943, Serial No. 498,134

12 Claims. (Cl. 244—150)

An object of my invention is to provide a parachute release, and it consists of the constructions, combination and arrangements hereinafter described and claimed.

An object of my invention is to provide a parachute release which does not make use of a clock timing mechanism for marking off a predetermined time period between the moment the rip-cord of the device is pulled and the moment the parachute is freed to permit it to open. The device does make use of a novel friction means which can be adjusted to cover a desired time interval between the time the rip-cord is pulled and the time the parachute is freed. The device can be used for releasing a parachute that carris freight or it can be used for releasing a parachute that carries a person.

The device is extremely compact in construction and may be readily attached to a standard parachute and will release the securing means that holds the folded parachute a given time period after the rip-cord is pulled. The device is designed to be used with my improved parachute shown in my co-pending application, Serial No. 436,761, filed March 30, 1942. In the copending case, the body of the parachute is formed from a plurality of diamond-shaped sections, each section being bounded by rigid rods whose ends are pivotally connected together by springs so that when the parachute is freed, the resiliency of the springs will immediately open the parachute. The parachute disclosed in my co-pending application can be folded into a compact bundle and this bundle has a strap wrapped therearound whose ends are secured to the parachute release device disclosed in the present case. When the rip-cord of the parachute release device is pulled the strap ends will be freed and this will free the strap from the folded parachute with the result that the parchute will open.

Other objects and advantages will appear in the following specification, and the novel features of the device will be particularly pointed out in the appended claims.

My invention is illustrated in the accompanying drawings forming a part of this application, in which:

Figure 1 is a side elevation of the device;

Figure 2 is a section substantially along the line of 2—2 of Figure 1;

Figure 3 is a longitudinal section taken substantially along the line 3—3 of Figure 2;

Figure 4 is a transverse section taken substantially along the line 4—4 of Figure 3;

Figure 5 is a transverse section taken substantially along the line 5—5 of Figure 2;

Figure 6 is a transverse section taken along the line 6—6 of Figure 2;

Figure 7 is an enlarged sectional view taken substantially along the line 7—7 of Figure 3;

Figure 8 is a top plan view of a portion of the device and illustrates the wedge;

Figure 9 is a sectional view of a modified form of the invention taken substantially along the line 9—9 of Figure 11;

Figure 10 is a section taken substantially along the line 10—10 of Figure 9;

Figure 11 is a section taken substantially along the line 11—11 of Figure 9;

Figure 12 is a transverse section taken substantially along the line 12—12 of Figure 9; and Figure 13 is a transverse section on an enlarged scale taken along the line 13—13 of Figure 9.

While I have shown only the preferred forms of my invention, it should be understood that various changes or modifications may be made within the scope of the appended claims without departing from the spirit and scope of the invention.

In carrying out my invention I provide a base A that may be made from any desired material. In the present showing, the base is constructed from sheet metal and has a pair of spaced lugs 1 at one end and a second pair of spaced lugs 2, at the other end, see Figure 3. The lugs 2 have slots 3, for receiving a handle 4, see Figure 2. The handle has a notch 5 therein for receiving one end of a coil spring 6.

Figures 2 and 7 show the other end of the spring 6 provided with a reduced portion 7 that receives a button 8, which in turn has an opening 9 for receiving a coiled wire 10. The wire 10 has an eyelet 11 formed therein which receives a removable pin 12. The pin 12 is connected to a rip-cord 13 of the parachute.

When the coil spring 6 is stretched between the two pairs of lugs 1 and 2 a block or hammer B carried by the spring is disposed an appreciable distance away from a U-shaped bolt C. The base A has sides 14 with pairs of aligned sleeves 15 for removably receiving the ends of the U-bolt C, see Figure 2. A strap D has its ends provided with eyelets 16 and these ends are removably secured to the base A by the U bolt C.

I provide novel means for causing a predetermined time period to elapse from the time the rip-cord 13 is pulled to remove the pin 12 and free one end of the spring 6 until the spring end is freed and permits the block or hammer B carried by the spring to strike the U bolt and free it from the sleeve 15 so that the ends of the strap D will be freed. The strap encircles the parachute (not shown), and normally holds it in folded position. When the strap D is freed, the parachute is allowed to open.

The novel means for delaying the movement of the hammer B against the bolt C comprises two friction brakes indicated generally at E and E'. The brake E' comprises a flexible pad 17 enclosing a filler 18. The brake pad E' is secured to the base A by rivets 19. The brake E, is movable toward and away from the pad E' and comprises a pad 20 mounted on a spring seat 21. Coiled springs 22 bear against the seat 21 and against an adjustable member 23.

Figure 2 illustrates how the base A has pairs of uprights 24 rising from the sides 14 and extending through recesses 25 formed in the movable spring seat 21. The uprights 24 have top members 26, see Figure 3, interconnecting each pair of uprights and these transverse top members carry set screws 27. A wedge F is inserted between the set screws 27 and the floating or adjustable member 23. The wedge has corrugations in its upper surface forming transverse grooves 28 in which the set screws seat.

It will be seen that as the wedge F is moved relatively to the set screws 27, the gradually increasing thickness of the wedge will force the floating member 23 toward the spring seat 21 and increase the compression of the springs 22. A portion of the coil spring 6 is received between the two resilient brakes E and E' and any increase of the compression of the springs 22 by the wedge will increase the frictional force exerted by the pads in gripping the coil spring 6 and tend to prevent it from being pulled too rapidly between the two brake pads. If desired, the wedge F may have numbers on its corrugated surface (not shown), indicating different elapsed time periods so that the pilot or other person using the device, can move the wedge to the desired number and will know the approximate time period that will elapse between the pulling of the rip-cord 13 and the freeing of the spring 6 from between the brake pads E and E'. As soon as the spring is freed, it will cause the hammer B to strike the bolt C and free the strap ends D from the device and permit the parachute to open.

From the foregoing description of the various parts of the device the operation thereof may be readily understood.

The strap D is normally wrapped around the folded parachute and the eyelets 16 are secured to the base A by the bolt C. In setting the device, the spring 6 has one end secured to the base by the pin 12 and then the handle 4 is pulled to stretch the spring and permit the handle to be placed in the slots 3. The spring 6 is now held under tension. A portion of the spring 6 lying between the hammer B and the pin 12 is received between the brake members E and E'. The pilot or other person who uses the device, adjusts the wedge F to place the desired number (not shown), adjacent to the member 26 and the coil springs 22 will be placed under the desired amount of compression. The springs 22 tend to move the pad 20 toward the pad 17 and frictionally grip the spring 6 between the pads.

The tension on the spring 6 is such that when the rip-cord 13 is pulled to free the pin 12, the freed end of the spring 6 will slowly move between the pads and this movement will require a predetermined time period before the spring 6 will be freed from the pads. As stated, the wedge F may be numbered to designate different time periods and adjusted to cause a desired lapse of time to take place before the spring 6 is freed. When a pilot or other person using the device on his parachute, jumps from the aeroplane, he pulls the rip-cord 13 at the instant he jumps. It is obvious that the rip-cord could be attached to some part of the aeroplane so that it would be automatically pulled at the time the person jumps. If freight is to be carried by the parachute, the rip-cord can be pulled at the time the package with its parachute is freed from the aeroplane.

A predetermined time interval will elapse between the pulling of the pin 12 to free the spring 6 and the freeing of the spring from the brake pads. After this predetermined time period has elapsed, the spring 6 is freed from the pads 20 and 17 and will move the hammer B against the bolt C with sufficient force to free the bolt from the sleeves 15. The freeing of the bolt releases the eyelets 16 of the strap D and permits the parachute to open immediately. No clock mechanism is necessary to control the time elapsing mechanism and this makes the device sturdy in construction and fool-proof.

A modified form of the invention is shown in Figures 9 to 13 inclusive. Here the base G is in the form of a casing with a removable cover H secured thereto. A coil spring 29 has one end secured to the base or casing G at 30 and its other end is passed around a brake-lining 31 which in turn, is secured to a drum 32. A flexible and elongated brake member has one end secured to the casing G at 34 and its other end passed around a spacing sleeve 35 and secured to a coil spring 36, the free end of the spring being secured to an arm 37. The flexible braking member 33 bears against the portion of the spring 29 that is passed around the brake-lining 31. The spring 36 places the flexible braking member 33 under tension so that this member will force the spring 29 against the lining 31 and retard the movement of the spring between the lining and the member 33 when the spring is freed.

The arm 37 is pivoted at 38 and has its free end slideable in a slot 39 provided in the casing wall. The slot has recesses 40 for holding the arm in different adjusted positions. The tension on the spring 36 is regulated by the particular slot 40 that receives the arm 37. The slots 40 may be numbered (not shown), to indicate different elapsed time periods.

It has been stated that one end of the spring 29 is secured to the casing at 30. The other end of the same spring is secured to the casing by a removable pin 41, see Figure 11. The pin 41 has a rip-cord 42 attached thereto. A shield 43, see Figures 9 and 13, is placed between the spring 29 and the spring 31 to prevent the former from striking the latter when the pin 41 is removed.

The operation of this form of the device is substantially the same as the form shown in Figures 1 to 8 inclusive and will be briefly explained. When the rip-cord 42 is pulled, the pin 41 is removed and the spring 29 will slowly move between the brake lining 31 and the flexible brake member 33. A predetermined time period will elapse during this movement and the length of the time period is controlled by the position of the arm 37 in the particular recess or notch 40.

When the spring 29 frees itself from the brake lining 31 and member 33, it will quickly move toward the spring end 30 and will carry the hammer 44 against the U bolt 45, with sufficient force to free the bolt and the strap D. The strap D holds the parachute in folded position and when this strap is freed it will permit the parachute to open immediately. Figures 9 and 12 show the legs of the U bolt removably received in sleeves 46.

I claim:

1. A parachute release comprising a base, an elongated coil spring placed under tension and having one end secured to the base, a removable pin securing the other spring end to the base, a rip cord connected to the pin, braking means frictionally engaging with the spring near the pin for retarding the movement of this spring end past the braking means when the pin is removed, a strap holding a parachute in closed position, eyelets carried by the strap ends, a bolt for removably connecting the strap eyelets to the base, and a hammer carried by the spring and movable against the bolt when the spring is freed from the braking means, said spring moving the hammer with sufficient force against the bolt to free the strap and permit the parachute to open.

2. A parachute release comprising a base, an elongated coil spring placed under tension and having one end secured to the base, a removable pin securing the other spring end to the base, a rip cord connected to the pin, braking means frictionally engaging with the spring near the pin for retarding the movement of this spring end past the braking means when the pin is removed, a strap holding a parachute in closed position, eyelets carried by the strap ends, a bolt for removably connecting the strap eyelets to the base, and a hammer carried by the spring and movable against the bolt when the spring is freed from the braking means, said spring moving the hammer with sufficient force against the bolt to free the strap and permit the parachute to open, and adjustable means for varying the frictional force exerted by the braking means on the coil spring end, whereby a predetermined and variable time period may be made to elapse between the removal of the pin and the freeing of the spring end from the braking means.

3. A parachute release comprising a base, an elongated coil spring placed under tension and having one end secured to the base, a removable pin securing the other spring end to the base, a rip cord connected to the pin, braking means including two pads frictionally engaging with the spring near the pin for retarding the movement of this spring end past the braking means when the pin is removed, said braking means including adjustable spring means for moving one of the pads toward the other with the desired force for varying the length of time to free the spring end from the pads after the pin has been removed, a strap holding a parachute in closed position, eyelets carried by the strap ends, a bolt for removably connecting the strap eyelets to the base, and a hammer carried by the spring and movable against the bolt when the spring is freed from the braking means, said spring moving the hammer with sufficient force against the bolt to free the strap and permit the parachute to open.

4. In combination, a base, an elongated coil spring placed under tension and having one end secured to the base, a removable pin securing the other spring end to the base, a rip cord connected to the pin, a pair of pads frictionally engaging with the spring near the pin for retarding the movement of this spring end past the pads when the pin is removed, spring means for urging one pad toward the other, adjustable means for varying the tension of the spring means, whereby the time period is varied for the spring end to free itself from the pads after the pin is removed, a strap holding a parachute in closed position, eyelets carried by the strap ends, a bolt for removably connecting the strap eyelets to the base, and a hammer carried by the spring and movable against the bolt when the spring is freed from the braking means, said spring moving the hammer with sufficient force against the bolt to free the strap and permit the parachute to open.

5. A parachute release comprising a base, an elongated coil spring placed under tension and having one end secured to the base, a brake drum having the other end of the spring wrapped therearound, a removable pin securing the other end of the spring to the base, a rip cord connected to the pin, a flexible braking strip frictionally engaging with the spring portion received on the drum, spring means for yieldingly holding the strip against the first named spring for retarding the movement of the spring end when the pin is removed, a strap holding a parachute in closed position, a bolt for removably connecting the strap ends to the base, and a hammer carried by the spring and movable against the bolt when the spring is freed from the drum and flexible braking strip, said spring moving the hammer with sufficient force against the bolt to free the strap and permit the parachute to open.

6. A parachute release comprising a base, an elongated coil spring placed under tension and having one end secured to the base, a brake drum having the other end of the spring wrapped therearound, a removable pin securing the other end of the spring to the base, a rip cord connected to the pin, a flexible braking strip frictionally engaging with the spring portion received on the drum, spring means for yieldingly holding the strip against the first named spring for retarding the movement of the spring end when the pin is removed, a strap holding a parachute in closed position, a bolt for removably connecting the strap ends to the base, and a hammer carried by the spring and movable against the bolt when the spring is freed from the drum and flexible braking strip, said spring moving the hammer with sufficient force against the bolt to free the strap and permit the parachute to open and manually adjustable means for varying the tension of the spring means and thereby vary the pressure of the strip on the first named spring, whereby the time period is varied for the spring end to free itself from the drum and strip after the pin is removed.

7. A parachute release comprising a base, an elongated coil spring placed under tension and having one end secured to the base, a removable pin securing the other spring end to the base, a rip cord connected to the pin, braking means frictionally engaging with the spring for retarding the movement of the spring past the braking means when the pin is removed, a strap holding a parachute in closed position, a bolt for removably connecting the strap to the base, and a hammer carried by the spring and movable against the bolt when the spring is freed from the braking means, said spring moving the hammer with sufficient force against the bolt to free the strap and permit the parachute to open.

8. A parachute release comprising a base, an elongated coil spring placed under tension and having one end secured to the base, a removable pin securing the other spring end to the base, a rip cord connected to the pin, braking means frictionally engaging with the spring for retarding the movement of the spring past the braking means when the pin is removed, a strap holding a parachute in closed position, a bolt for removably connecting the strap to the base, a hammer carried by the spring and movable against the bolt when the spring is freed from the braking means, said spring moving the hammer with sufficient force against the bolt to free the strap and permit the parachute to open, and adjustable means for varying the frictional force exerted by the braking means on the coil spring, whereby a predetermined and variable time period may be made to elapse between the removal of the pin and the freeing of the spring from the braking means.

9. A parachute release comprising a base, an elongated coil spring placed under tension and having one end secured to the base, a removable pin securing the other spring end to the base, a rip cord connected to the pin, braking means including two pads frictionally engaging with the spring for retarding the movement of the spring past the braking means when the pin is removed, said braking means including adjustable spring means for moving one of the pads toward the other with the desired force for varying the length of time to free the spring from the pads after the pin has been removed, a strap holding a parachute in closed position, a bolt for removably connecting the strap to the base, and a hammer carried by the spring and movable against the bolt when the spring is freed from the braking means, said spring moving the hammer with sufficient force against the bolt to free the strap and permit the parachute to open.

10. In combination, a base, an elongated coil spring placed under tension and having one end secured to the base, a removable pin securing the other spring end to the base, a rip cord connected to the pin, a pair of pads frictionally engaging with the spring for retarding the movement of the spring past the pads when the pin is removed, spring means for urging one pad toward the other, adjustable means for varying the tension of the spring means, whereby the time period is varied for the spring to free itself from the pads after the pin is removed, a strap holding a parachute in closed position, a bolt for removably connecting the strap to the base, and a hammer carried by the spring and movable against the bolt when the spring is freed from the braking means, said spring moving the hammer with sufficient force against the bolt to free the strap and permit the parachute to open.

11. A parachute release comprising a base, an elongated coil spring placed under tension and having one end secured to the base, removable means securing the other spring end to the base, a rip cord for actuating said means for freeing the spring end, said spring tending to return to an untensioned condition when freed by said means, spring retarding means for retarding the movement of the spring into untensioned condition when the spring end is freed, means holding a parachute closed, and means actuated by the spring returning to untensioned or normal position for freeing the parachute holding means and permitting the parachute to open.

12. A parachute release comprising a base, an elongated coil spring placed under tension and having one end secured to the base, removable means securing the other spring end to the base, a rip cord for actuating said means for freeing the spring end, said spring tending to return to an untensioned condition when freed by said means, spring retarding means for retarding the movement of the spring into untensioned condition when the spring end is freed, means holding a parachute closed, and means actuated by the spring returning to untensioned or normal position for freeing the parachute holding means and permitting the parachute to open, said spring retarding means including adjustable means for varying the length of time required for the spring to return to normal position, whereby the time period between the freeing of the spring end and the freeing of the parachute holding means can be varied.

JOHN D. FORBES.